UNITED STATES PATENT OFFICE.

JAMES WEST, OF SYRACUSE, NEW YORK.

IMPROVEMENT IN ROOFING COMPOSITIONS.

Specification forming part of Letters Patent No. 13,733, dated October 30, 1855.

*To all whom it may concern:*

Be it known that I, JAMES WEST, of the city of Syracuse, in the county of Onondaga and State of New York, have invented a new and useful Composition of Matter for Roofing Purposes; and I hereby declare that the following is a full, clear, and exact description thereof.

The nature of my invention consists in forming a compound of certain materials hereinafter mentioned, which combined and applied in the manner and proportion presently to be described and applied to any slate, metallic, or wooden surface will there form a hard and durable covering, impervious to water and the action of the atmosphere. It is particularly designed for roofing.

The following are the ingredients used: caoutchouc or india-rubber dissolved in spirits of turpentine or some other suitable solvent, gum-shellac dissolved in alcohol, gutta-percha dissolved in linseed-oil or other suitable solvent, a mixture which I call "pozzuolana," (which may be composed of pulverized glass, quick-lime pulverized and sifted, and plaster-of-paris, or marble-dust, or any kind of clay well vitrified and pulverized, or any equivalent substances,) and another mixture which I call "smalt," (which may be composed of vitrified glass, sand, flint, gravel, pounded earthenware, or any equivalent pulverized substances which will withstand the action of the atmosphere,) and naphtha or coal-tar. The use of lime is indispensable in the working of this cement, from the fact that without it the materials do not harden, but become friable and undergo apparent decomposition. The lime, on the contrary, seems to have the effect of hardening and curing the mass and rendering it capable of enduring atmospheric changes without any injurious effects.

The proportions which I have found best in practice are: to sixteen ounces of naphtha, half an ounce of india-rubber, half an ounce of shellac, and half an ounce of gutta-percha dissolved in the above-mentioned solvents, two ounces of the pozzuolana and two ounces of the smalt.

The process of using the above composition is to warm the solutions of india-rubber, gum-shellac, gutta-percha, and the naphtha to blood-heat. Then mix therewith the pozzuolana and immediately apply it with a brush to the roof and rub it smooth or even. Then sift on the smalt while the compound is green. When used upon wood it is necessary to cover the wood with some textile fabric, such as burlap or sacking.

What I claim as my invention, and desire to secure by Letters Patent, is—

The use of lime, in combination with the rubber, gutta-percha, and shellac solutions in the composition as set forth, for the purpose specified.

In testimony whereof I have hereunto signed my name this 8th day of March, 1855.

JAMES WEST.

Witnesses:
CHAS. EVERETT,
W. R. CORNELL.